US009277548B2

(12) United States Patent
Liao et al.

(10) Patent No.: US 9,277,548 B2
(45) Date of Patent: Mar. 1, 2016

(54) PHYSICAL STRUCTURE AND REFERENCE SIGNAL UTILIZATION OF ENHANCED PHYSICAL DOWNLINK CONTROL CHANNEL FOR OFDM/OFDMA SYSTEMS

(71) Applicant: MEDIATEK, INC., Hsin-Chu (TW)

(72) Inventors: Pei-Kai Liao, Nantou County (TW); Hua-Min Chen, Beijing (CN); Xiangyang Zhuang, Lake Zurich, IL (US)

(73) Assignee: MEDIATEK INC. (TW)

( * ) Notice: Subject to any disclaimer, the term of this patent is extended or adjusted under 35 U.S.C. 154(b) by 105 days.

(21) Appl. No.: 13/927,113

(22) Filed: Jun. 26, 2013

(65) Prior Publication Data

US 2013/0286980 A1 Oct. 31, 2013

Related U.S. Application Data

(63) Continuation of application No. PCT/CN2013/072712, filed on Mar. 15, 2012.

(51) Int. Cl.
*H04W 72/02* (2009.01)
*H04W 72/04* (2009.01)
(Continued)

(52) U.S. Cl.
CPC .......... *H04W 72/042* (2013.01); *H04L 1/0045* (2013.01); *H04L 1/0072* (2013.01); *H04L 5/0025* (2013.01); *H04L 5/0053* (2013.01); *H04W 48/16* (2013.01); *H04L 1/0061* (2013.01)

(58) Field of Classification Search
USPC .......................................................... 370/329
See application file for complete search history.

(56) References Cited

U.S. PATENT DOCUMENTS

2011/0044391 A1  2/2011  Ji et al. .......................... 375/260
2011/0076962 A1  3/2011  Chen et al. ....................... 455/68
(Continued)

FOREIGN PATENT DOCUMENTS

CN    102111880 A    12/2009
CN    102395206       11/2011
(Continued)

OTHER PUBLICATIONS

International Search Report and Written Opinion of International Search Authority for PCT/CN2013/072712 dated Jun. 20, 2013 (12 pages).
(Continued)

*Primary Examiner* — Edan Orgad
*Assistant Examiner* — Sithu Ko
(74) *Attorney, Agent, or Firm* — Imperium Patent Works; Zheng Jin; Helen Mao (57) ABSTRACT

A two-level physical structure is defined for better diversity for both distributed and localized transmission in enhanced physical downlink control channel (ePDCCH). First level is a physical unit of enhanced resource element groups (eREGs), where the group of REs is predefined for each eREG. Second level is a logical unit of enhanced control channel elements (eCCEs), where the group of eREGs is predefined or configurable by higher layer for each eCCE. For distributed transmission of ePDCCH, eCCE consists of several eREGs that are distributed in multiple non-contiguous PRBs spreading over the whole channel frequency. Downlink control information (DCI) is transmitted on a number of aggregated eCCEs according to the modulation and coding level required. The utilization reference signals of antenna ports for ePDCCH demodulation is based on the logical order of eCCEs and the aggregation level for DCI transmission.

20 Claims, 10 Drawing Sheets

(51) Int. Cl.
*H04L 1/00* (2006.01)
*H04L 5/00* (2006.01)
*H04W 48/16* (2009.01)

(56) References Cited

U.S. PATENT DOCUMENTS

| | | | |
|---|---|---|---|
| 2011/0077038 A1 | 3/2011 | Montojo et al. | 455/507 |
| 2011/0249633 A1 | 10/2011 | Hong et al. | 370/329 |
| 2011/0268062 A1 | 11/2011 | Ji et al. | 370/329 |
| 2011/0274031 A1 | 11/2011 | Gaal et al. | 370/315 |
| 2011/0310829 A1 | 12/2011 | Ji et al. | 370/329 |
| 2012/0039283 A1 | 2/2012 | Chen et al. | 370/329 |
| 2012/0106465 A1 | 5/2012 | Haghighat et al. | 370/329 |
| 2013/0039284 A1* | 2/2013 | Marinier et al. | 370/329 |
| 2013/0044693 A1 | 2/2013 | Lindh et al. | 370/329 |
| 2013/0100901 A1* | 4/2013 | Shan et al. | 370/329 |
| 2013/0114521 A1 | 5/2013 | Frenne et al. | 370/329 |
| 2013/0194931 A1* | 8/2013 | Lee et al. | 370/241 |
| 2013/0242904 A1 | 9/2013 | Sartori et al. | 370/329 |
| 2013/0301608 A1 | 11/2013 | Frenne et al. | 370/329 |
| 2014/0126487 A1 | 5/2014 | Chen et al. | 370/329 |
| 2014/0286297 A1 | 9/2014 | Zhao et al. | 370/329 |

FOREIGN PATENT DOCUMENTS

| | | |
|---|---|---|
| CN | 102395206 A | 11/2011 |
| EP | 2713658 | 5/2011 |
| EP | 2779768 | 8/2011 |
| EP | 2811799 A1 | 1/2012 |
| JP | 2013157822 A | 1/2012 |
| WO | WO2011037439 | 9/2009 |
| WO | WO2011126212 | 4/2010 |
| WO | WO2011136523 A2 | 4/2010 |

OTHER PUBLICATIONS

3GPP TSG RAN WG1 Meeting #68 R1-120453, LG Electronics, "Discussion on Multiplexing of DCI Messages", Dresden, Germany, Feb. 6-10, 2012 (4 pages).

3GPP TSG Ran WG1 Meeting #68 R1-120332, Research in Motion, UK Limited, "Further Discussion on Reference Signals for E-PDCCH", Dresden, Germany, Feb. 6-10, 2012 (5 pages).

3GPP TSG RAN WG1 Meeting #67 R1-114081, NTT DOCOMO, "Mapping Design for E-PDCCH in Rel-11", San Francisco, USA, Nov. 14-18, 2011 (5 pages).

3GPP TSG WG1 Meeting #68 R1-120330, Research in Motion, UK Limited, "Search Space Design for E-PDCCH", Dresden, Germany, Feb. 6-10, 2012 (6 pages).

USPTO, Office Actions for related U.S. Appl. No. 13/847,619 dated Oct. 2, 2014 (12 pages).

International Search Report and Written Opinion of International Search Authority for PCT/CN2013/072976 dated Jun. 27, 2013 (12 pages).

USPTO, Office Action for related U.S. Appl. No. 13/889,554 dated Feb. 19, 2015 (17 pages).

International Search Report and Written Opinion of International Search Authority for PCT/CN2013/075387 dated Aug. 15, 2013 (10 pages).

USPTO, Office Action for related U.S. Appl. No. 13/889,554 dated Jun. 3, 2015 (22 pages).

USPTO, Office Action for related U.S. Appl. No. 13/847,619 dated Aug. 11, 2015 (16 pages).

EPO, Search Report for the EP patent application 13761407.9 dated Jun. 25, 2015 (8 pages).

R1-112517 3GPP TSG-RAN1#66 meeting; Samsung; Discussion on ePDCCH Design Issue; Athens, Greece dated Aug. 22-26, 2011 (4 pages).

R1-120237 3GPP TSG RAN WG1 Meeting #68; Panasonic; Multiplexing of ePDCCHs and ePDCCH RE Mapping; Dresden, Germany dated Feb. 6-10, 2012 (4 pages).

R1-120383 3GPP TSG-RAN WG1 Meeting #68; Renesas Mobile Europe Ltd.; On ePDCCH Search Spaces; Dresden, Germany dated Feb. 6-10, 2012 (3 pages).

R1-120454 3GPP TSG RAN WG1 Meeting #68; LG Electronics; Concept of E-PDCCH CCE; Dresden, Germany dated Feb. 6-10, 2012 (3 pages).

R1-112219 3GPP TSG RAN WG1 Meeting #66; Intel Corporation; on Downlink Control Signaling Enhancement; Athens, Greece dated Aug. 22-26, 2011 (4 pages).

R1-104650 3GPP TSG RAN WG1 Meeting #62; LG Electronics; An Overview on R-PDCCH Design; Madrid, Spain dated Aug. 23-27, 2010 (7 pages).

JPO, Office Action for the JP patent application 2014-561279 dated Sep. 1, 2015 (10 pages).

EPO, Search Report for the EP patent application 13787661.1 dated Sep. 18, 2015 (5 pages).

3GPP TSG RAN WG1 #66bis R1-113372, LG-Ericsson, Consideration on E-PDCCH Multiplexing and Signaling, Zhuhai, China dated Oct. 14, 2011 (3 pages).

EPO, Search Report for the EP patent application 13764895.2 dated Oct. 6, 2015 (8 pages).

JPO, Office Action for the JP patent application 2015-500760 (no English translation) dated Nov. 24, 2015 (5 pages).

3GPP TSG RAN WG1 Meeting #68 R1-120111, CATT, Design of E-PDCCH Search Space, Dresden, Germany dated Feb. 6-10, 2012 (4 pages).

3GPP TSG WG1 Meeting #68 R1-120681, KDDI Corp., Configuration of Localized and Distributed Transmission for E-PDCCH, Dresden, Germany dated Feb. 6-10, 2012 (3 pages).

3GPP TSG RAN WG1 Meeting #68 R1-120140, InterDigital Communications et al., On Search Space Design for ePDCCH in Rel-11, Dresden, Germany dated Feb. 6-10, 2012 (3 pages).

* cited by examiner

TWO LEVEL OF PHYSICAL STRUCTURE USING
eREG AND DISTRIBUTED eCCE

FIG. 6

TWO LEVEL OF PHYSICAL STRUCTURE USING
eREG AND DISTRIBUTED eCCE

FIG. 7

TWO LEVEL OF PHYSICAL STRUCTURE USING
eREG AND LOCALIZED eCCE

FIG. 8

TWO LEVEL OF PHYSICAL STRUCTURE USING
eREG AND LOCALIZED eCCE

DECODING PROCEDURE FOR DISTRIBUTED
TRANSMISSION OF ePDCCH

FIG. 13

PHYSICAL STRUCTURE AND REFERENCE SIGNAL UTILIZATION OF ENHANCED PHYSICAL DOWNLINK CONTROL CHANNEL FOR OFDM/OFDMA SYSTEMS

CROSS REFERENCE TO RELATED APPLICATIONS

This application is filed under 35 U.S.C. §111(a) and is based on and hereby claims priority under 35 U.S.C. §120 and §365(c) from International Application No. PCT/CN2013/072712, with an international filing date of Mar. 15, 2013, which in turn claims priority from Chinese Application No. 201210071806.0, filed on Mar. 16, 2012, in China. This application is a continuation of International Application No. PCT/CN2013/072712, which claims priority from Chinese Application No. 201210071806.0. International Application No. PCT/CN2013/072712 is pending as of the filing date of this application, and the United States is a designated state in International Application No. PCT/CN2013/072712. This application claims the benefit under 35 U.S.C. §119 from Chinese Application No. 201210071806.0. The disclosure of each of the foregoing documents is incorporated herein by reference.

TECHNICAL FIELD

The disclosed embodiments relate generally to physical downlink control channel (PDCCH), and, more particularly, to enhanced ePDCCH structure and reference signal utilization in OFDM/OFDMA systems.

BACKGROUND

LTE-Advanced (LTE-A) system improves spectrum efficiency by utilizing a diverse set of base stations deployed in a heterogeneous network topology. Using a mixture of macro, pico, femto and relay base stations, heterogeneous networks enable flexible and low-cost deployments and provide a uniform broadband user experience. In a heterogeneous network (HetNet), smarter resource coordination among base stations, better base station selection strategies and more advance techniques for efficient interference management can provide substantial gains in throughput and user experience as compared to a conventional homogeneous network. For example, coordinated multiple points (CoMP), also known as multi-BS/site MIMO, is used to enhance the performance of cell-edge UEs in LTE-Advanced systems.

In 3GPP RAN1#65, the issue of downlink control capacity was first discussed for CoMP scenario 4, where both macro-cell base station and remote radio heads (RRH) inside the macrocell coverage share the same physical cell ID. In 3GPP RAN1#66, it was agreed as a working assumption to have a new physical control channel inside the region of legacy physical downlink shared channel (PDSCH). The main benefits to have this new physical control channel are for the better support of HetNet, CoMP, and MU-MIMO. In 3GPP RAN1#68, it was agreed that the enhanced physical downlink control channel (ePDCCH) spans both first and second slots in the region of legacy PDSCH.

Various proposals have been made related to the design of ePDCCH. The following is a list of such examples: R1-14124, "Multiplexing e-PDCCH with PDSCH" by Qualcomm, RAN1#67, November 2011; R1-114240, "Performance evaluation of enhanced control channel based on UE-specific reference signaling" by Samsung, RAN1#67, November 2011; R1-114396, "DM-RS based distributed and localized e-PDCCH structure" by Samsung, RAN1#67, November 2011; R1-114302, "DM-RS design for e-PDCCH in Rel-11" by NTT DoCoMo, Ran1#67, November 2011; and R1-120076, "On reference signal design for enhanced control channels" by Ericsson, RAN1#68, February 2012.

Based on ePDCCH design spanning in both first and second slots in the region of legacy PDSCH, it is desirable to design the physical structure of ePDCCH to support both distributed and localized transmission to exploit either diversity or beamforming gain. Furthermore, at most four antenna ports of UE-specific reference signals are used for ePDCCH. It is also desirable to know how to utilize the UE-specific reference signals for both distributed and localized transmission to exploit either diversity or beamforming gain in ePDCCH.

SUMMARY

The physical structure of enhanced physical downlink control channel (ePDCCH) can be either one level or two levels. In a first scheme of physical structure, one level of physical structure is defined for both distributed and localized transmission in ePDCCH—a unit of enhanced resource element groups (eREGs), where the group of resource elements (REs) is predefined for each eREG. In a localized method of constructing eREG, eREG is a group of physically contiguous REs, which are allocated for either data or reference signals. The group of REs span in one PRB or PRB pair. In a distributed method of constructing eREG, eREG is a group of physically distributed non-contiguous contiguous REs, which exclude reference signals for demodulation and are allocated for data transmission only. The group of REs spread in one PRB or PRB pair as well. The downlink control information (DCI) is transmitted on a number of aggregated eREGs directly in either a distributed way or a localized way according to the modulation and coding level required.

In a second scheme of physical structure, two levels of physical structure are defined for better diversity for both distributed and localized transmission in ePDCCH. The first level is a physical unit of eREGs, where the group of REs is predefined for each eREG. Each eREG can be localized or distributed within a PRB or PRB pair. The second level is a logical unit of enhanced control channel elements (eCCEs), where the group of eREGs is predefined or configured for each eCCE. For distributed transmission of ePDCCH, eCCE consists of several eREGs that are distributed in multiple non-contiguous PRBs spreading over the whole channel frequency so that frequency diversity gain can be maximally exploited using distributed eCCE structure. For localized transmission of ePDCCH, eCCE consists of several eREGs that are uniformly distributed in a single PRB so that it facilitates uniform utilization of reference signals inside one PRB for better robustness in channel estimation. The DCI is transmitted on a number of aggregated eCCEs according to the modulation and coding level required.

In one novel aspect, the utilization of antenna ports is based on the logical order of eCCEs and the aggregation level for DCI transmission. If the UE blindly decodes the downlink control information utilizing single eCCE, then the antenna port for ePDCCH demodulation is based on the logic address of the single eCCE. On the other hand, if the UE blindly decodes the downlink control information utilizing multiple eCCEs, then the antenna port for ePDCCH demodulation is based on the logical address of a specific eCCE among the multiple eCCEs.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
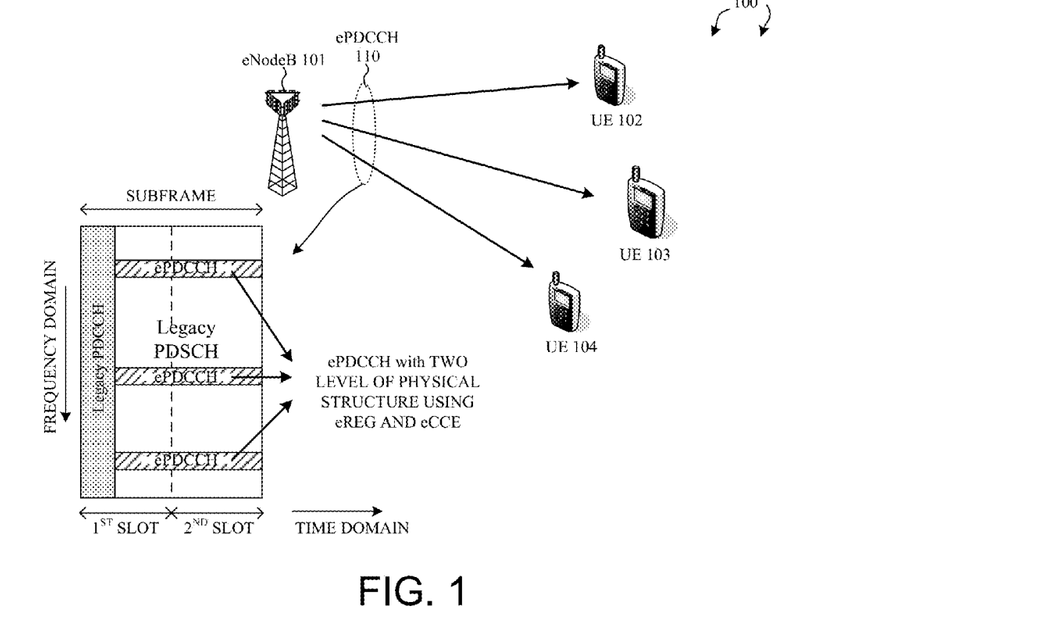
FIG. 1 illustrates a mobile communication network utilizing an enhanced physical downlink control channel in accordance with one novel aspect.

FIG. 1 illustrates a mobile communication network 100 utilizing an enhanced physical downlink control channel (ePDCCH) in accordance with one novel aspect. Mobile communication network 100 is an OFDM/OFDMA system comprising a base station eNodeB 101 and a plurality of user equipment UE 102, UE 103, and UE 104. When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical downlink uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI).

In the example of FIG. 1, an enhanced physical downlink control channel (ePDCCH) 110 is used for eNodeB 101 to send DCI to the UEs. In 3GPP LTE system based on OFDMA downlink, the radio resource is partitioned into subframes, each of which is comprised of two slots and each slot has seven OFDMA symbols along time domain. Each OFDMA symbol further consists of a number of OFDMA subcarriers along frequency domain depending on the system bandwidth. The basic unit of the resource grid is called Resource Element (RE), which spans an OFDMA subcarrier over one OFDMA symbol. A physical resource block (PRB) occupies one slot and twelve subcarriers, while a PRB pair occupies two consecutive slots. In one novel aspect, ePDCCH 110 spans both first and second slots in the region of legacy PDSCH. Furthermore, ePDCCH 110 has either a single level or two levels of physical structure to exploit either frequency diversity or beamforming gain.

Figure 2:
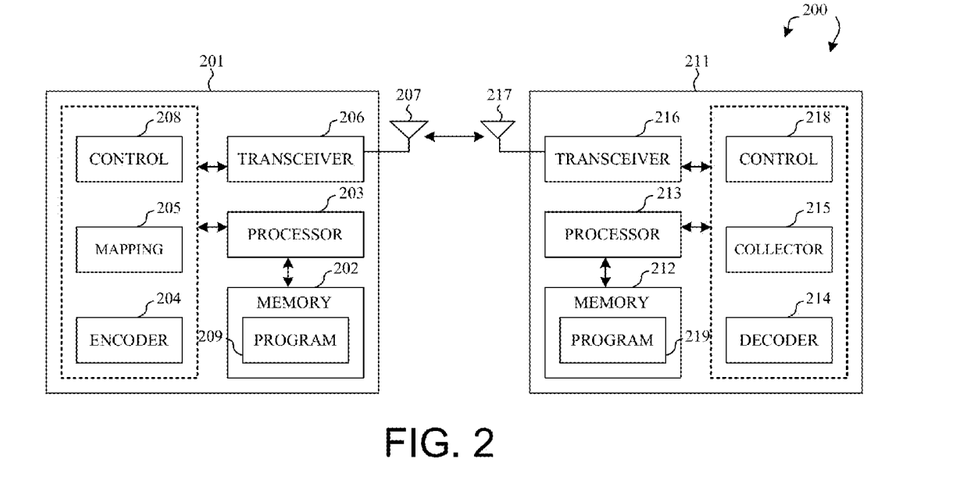
FIG. 2 illustrates simplified block diagrams of a base station and a user equipment in accordance with embodiments of the present invention.

FIG. 2 illustrates simplified block diagrams of a base station 201 and a user equipment 211 in accordance with embodiments of the present invention. For base station 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in base station 201. Memory 202 stores program instructions and data 209 to control the operations of the base station.

Similar configuration exists in UE 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in UE 211. Memory 212 stores program instructions and data 219 to control the operations of the UE.

The base station 201 and UE 211 also include several functional modules to carry out some embodiments of the present invention. The different functional modules can be implemented by software, firmware, hardware, or any combination thereof. The function modules, when executed by the processors 203 and 213 (e.g., via executing program codes 209 and 219), for example, allow base station 201 to encode and transmit downlink control information to UE 211, and allow UE 211 to receive and decode the downlink control information accordingly. In one example, base station 201 configures a set of radio resource for ePDCCH transmission via control module 208 and maps the downlink control information to the configured REs via mapping module 205. The downlink control information carried in ePDCCH is then modulated and encoded via encoder 204 to be transmitted by transceiver 206 via antenna 207. UE 211 receives the downlink control information by transceiver 216 via antenna 217. UE 211 determines the configured radio resource for ePDCCH transmission via control module 218 and collects the configured REs via collector 215. UE 211 then demodulates and decodes the downlink information from the collected REs via decoder 214.

The physical structure of ePDCCH can be either one level or two levels. In a first proposed scheme of physical structure, one level of physical structure is defined for both distributed and localized transmission in ePDCCH—a unit of enhanced resource element groups (eREGs), where the group of REs is predefined for each eREG. The downlink control information is transmitted on a number of aggregated eREGs directly in either a distributed way or a localized way according to the modulation and coding level required.

Figure 3:
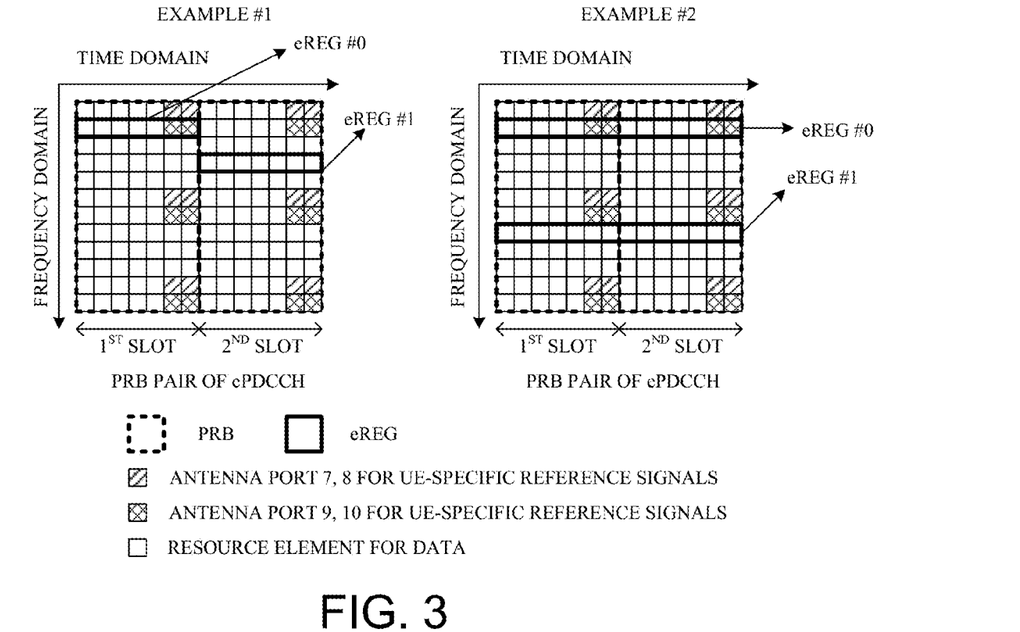
FIG. 3 illustrates examples of a single-level physical structure of ePDCCH with localized eREG.

FIG. 3 illustrates examples of a single-level physical structure of ePDCCH with localized eREGs. As illustrated in FIG. 3, ePDCCH is allocated within one PRB or PRB pair. There are two ways to construct an eREG. In a localized method, eREG is a group of physically contiguous reference elements (REs), which are allocated for either data or reference signals, such as cell-specific reference signals (CRS), UE-specific reference signals (DM-RS), and channel state information reference signals (CSI-RS). The group of REs span in one PRB or PRB pair. The number of REs allocated for data in one eREG may vary due to the RE reservation of reference signals and legacy PDCCH (e.g., the first three OFDMA symbols are reserved for legacy PDCCH). In Example #1 of FIG. 3, eREG #0 consists contiguous REs in the first PRB of the PRB pair, eREG #1 consists contiguous REs in the second PRB of the PRB pair. In Example #2 of FIG. 3, eREG #0 consists contiguous REs across the PRB pair, eREG #1 also consists contiguous REs across the PRB pair.

Figure 4:
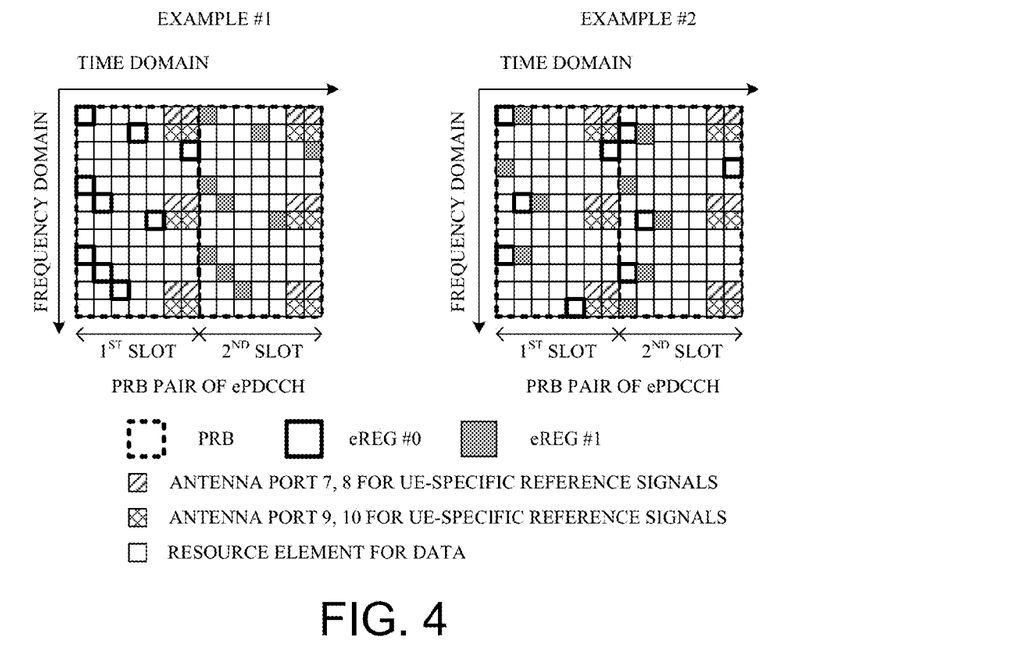
FIG. 4 illustrates examples of a single-level physical structure of ePDCCH with distributed eREG.

FIG. 4 illustrates examples of a single-level physical structure of ePDCCH with distributed eREGs. In a distributed method of constructing eREG, eREG is a group of physically distributed non-contiguous REs, which are allocated for data transmission only. The group of REs spread in one PRB or PEB pair as well. In Example #1 of FIG. 4, eREG #0 consists REs distributed in the first PRB of the PRB pair, eREG #1 consists REs distributed in the second PRB of the PRB pair. In Example #2 of FIG. 4, eREG #0 consists REs distributed across the PRB pair, eREG #1 also consists REs distributed across the PRB pair. The eREG to RE mapping are predefined in the system. Each eREG is associated with a logical address. Note that the distributed REs allocated for eREG do not include REs allocated for reference signals such as UE-specific reference signals (DM-RS), which are utilized for ePDCCH demodulation. However, there may exist some reference signals that are not used for the demodulation of ePDCCH within a predefined distributed eREG. For example, reference signals such as CRS, CSI-RS, PRS, etc. These reference signals may exist or may not exist within a predefined distributed eREG, and UE has to rate match around these reference signals if they exist.

Figure 5:
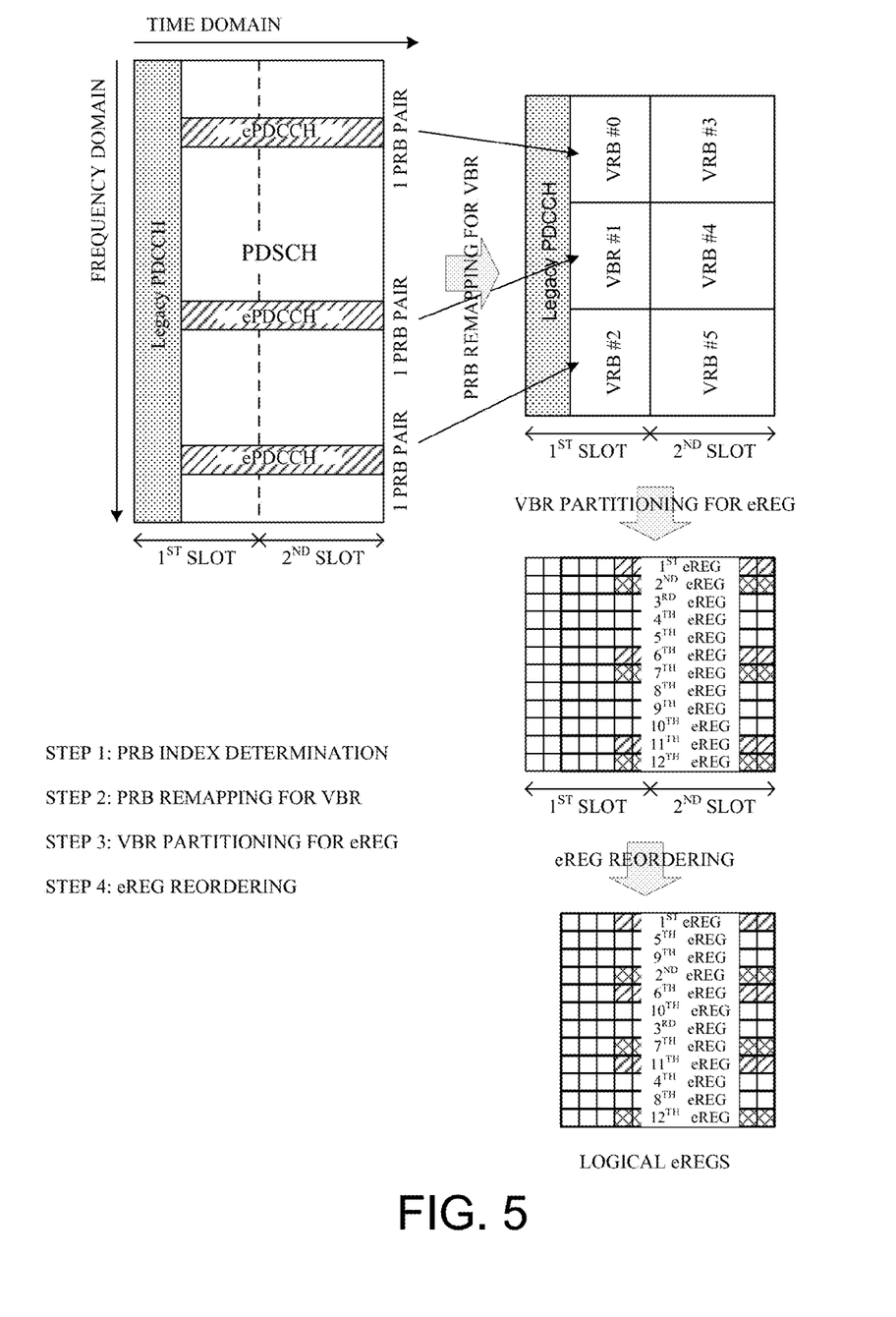
FIG. 5 illustrates a procedure for UE to determine the eREGs for the transmission of downlink control information.

FIG. 5 illustrates a procedure for UE to determine the eREGs for the transmission of downlink control information. In step 1, UE determines the PRBs or PRB pairs that are configured for ePDCCH transmission based on signaling from the base station. The signaling can be dynamic signaling (layer 1 signaling), semi-static signaling (RRC signaling), system information, or any combination thereof. UE decodes the signaling to determine the PRBs or PRB pairs allocated for ePDCCH transmission. For example, three PRB pairs in FIG. 5 are allocated for ePDCCH transmission. In step 2, the UE maps the PRBs to VRBs (virtual resource block), where the UE follows a predefined or configured mapping rule based on the indices of PRBs to determine the indices of the VRBs. Only the indices of each PRB are remapped to new indices of each VRB, the composing REs of each VRB remain the same as those of each corresponding PRB. In step 3, the UE follows a predefined or configured partitioning rule to partition each VRB into multiple eREGs and then determine the logical address of each eREG. In step 4, the UE maps the physical eREGs to a series of logical eREGs with ordered logical addresses. Because the downlink control information is transmitted on a number of logical eREGs by the base station, the UE can decode the downlink control information from the logical eREGs.

In a second proposed scheme of physical structure, two levels of physical structure are defined for better diversity for both distributed and localized transmission in ePDCCH. First level is a physical unit of enhanced resource element groups (eREGs), where the group of REs is predefined for each eREG. The eREGs can be either localized or distributed within a PRB or PRB pair as illustrated in FIGS. 3 and 4. Second level is a logical unit of enhanced control channel elements (eCCEs), where the group of eREGs is predefined or configurable by higher layer for each eCCE. The downlink control information is transmitted on a number of aggregated eCCEs according to the modulation and coding level required.

In the second proposed scheme of physical structure, eCCE consists of several eREGs, which can be in either single PRB or multiple PRBs. For distributed transmission of ePDCCH, eCCE consists of several eREGs that are distributed in multiple non-contiguous PRBs spreading over the whole channel frequency so that frequency diversity gain can be maximally exploited using distributed eCCE structure. For localized transmission of ePDCCH, eCCE consists of several eREGs that are uniformly distributed in single PRB so that it facilitates uniform utilization of reference signals inside one PRB for better robustness in channel estimation. If the eREGs of an eCCE locate in a localized area inside one PRB, the channel estimation will heavily depend on the reference signals nearby the eREGs so channel estimation performance will largely degrade if those reference signals are interfered. With uniformly distributed eREGs, such effect can be mitigated.

Figure 6:
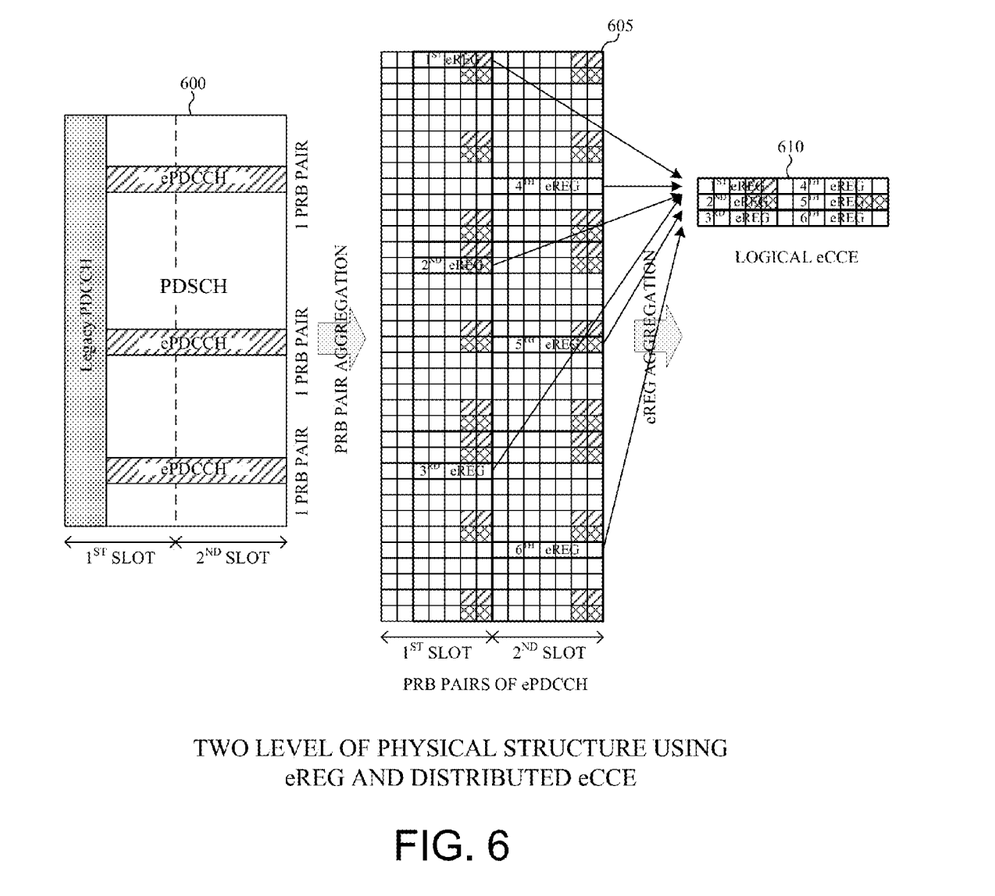
FIG. 6 illustrates a first example of a two-level physical structure of ePDCCH using eREG and distributed eCCE.

FIG. 6 illustrates a first example of a two-level physical structure of ePDCCH using eREG and distributed eCCE. As illustrated in FIG. 6, one or more ePDCCHs are allocated within in several configured PRBs or PRB pairs (e.g., three PRB pairs) in a given subframe 600. All three configured PRB pairs 605 are then aggregated for ePDCCH transmission. For distributed ePDCCH transmission, one eCCE consists of several eREGs that are distributed across multiple PRBs or PRB pairs. For example, eCCE 610 consists of six eREGs (e.g., $1^{st}$ eREG to $6^{th}$ eREG), and each eREG is located in a different PRB. The eCCE to eREG mapping are predefined in the system and multiple eCCEs are defined. Each eCCE is associated with a logical address. The downlink control information is then transmitted on one or more eCCEs consecutively.

Figure 7:
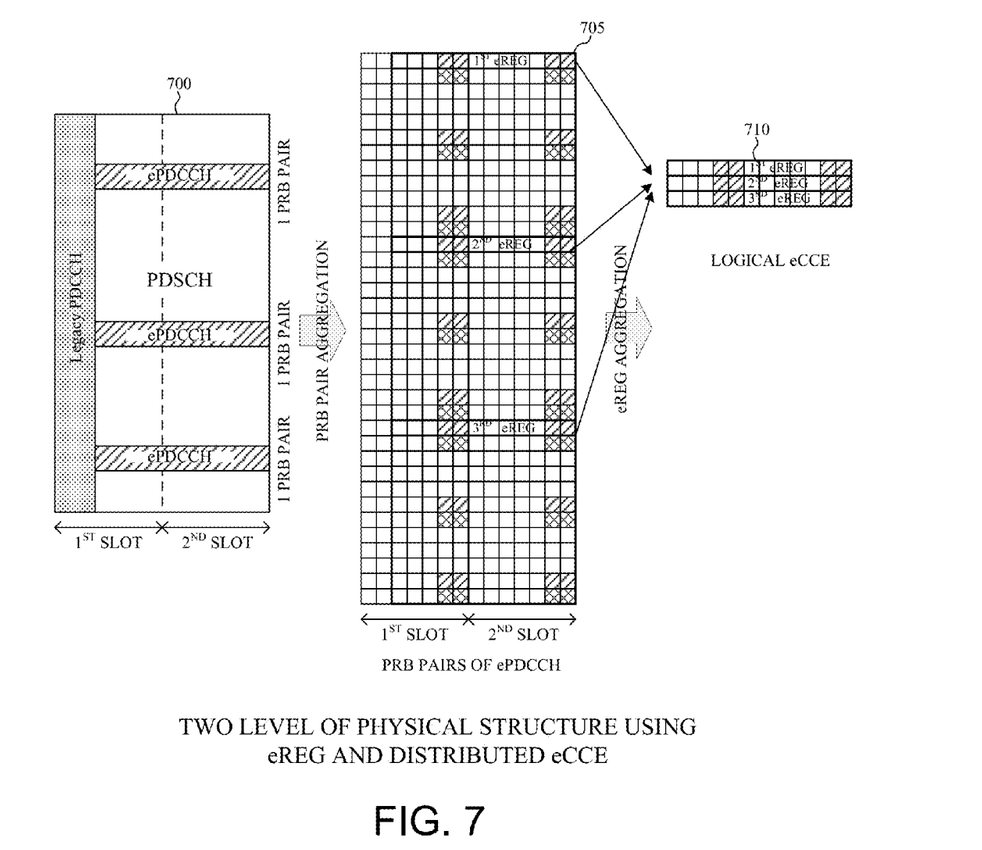
FIG. 7 illustrates a second example of a two-level physical structure of ePDCCH using eREG and distributed eCCE.

FIG. 7 illustrates a second example of a two-level physical structure of ePDCCH using eREG and distributed eCCE. FIG. 7 is very similar to FIG. 6, where three PRB pairs 705 are configured in a given subframe 700 and aggregated for ePDCCH transmission. In the example of FIG. 7, eCCE 710 consists of three eREGs (e.g., $1^{st}$ eREG, $2^{nd}$ eREG, and $3^{rd}$ eREG) that are distributed in three different PRB pairs.

Figure 8:
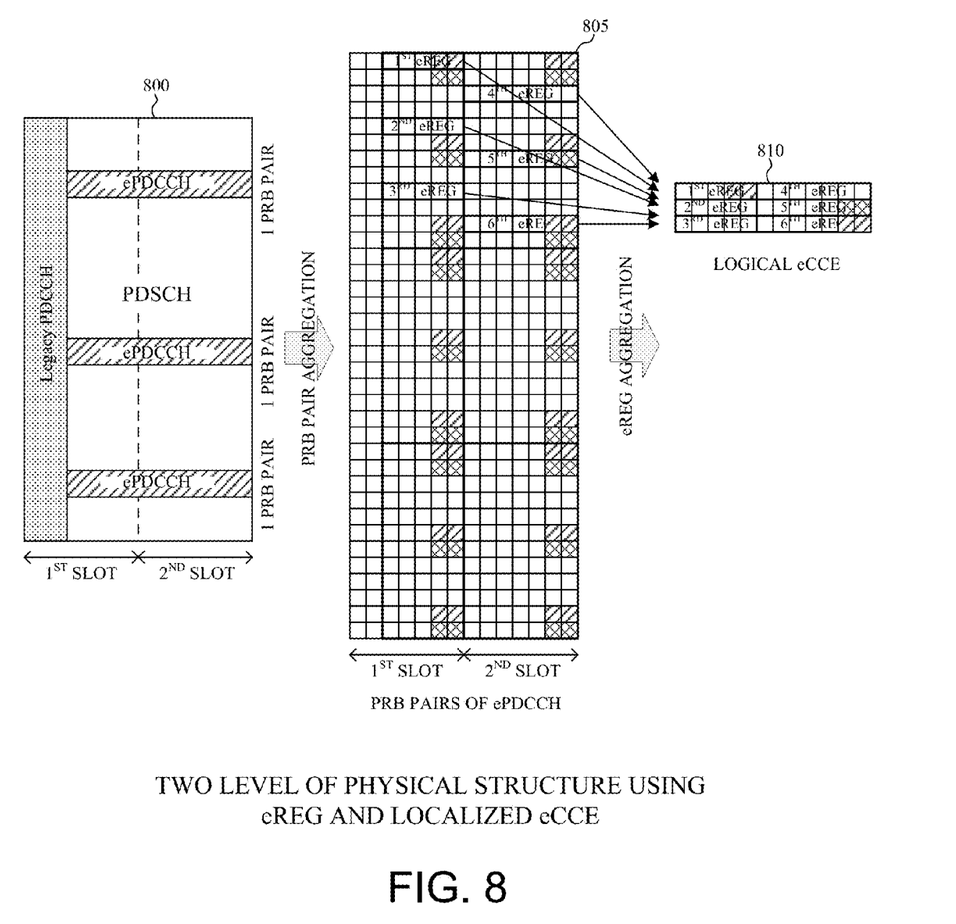
FIG. 8 illustrates a first example of two level physical structure of ePDCCH using eREG and localized eCCE.

FIG. 8 illustrates a first example of a two-level physical structure of ePDCCH using eREG and localized eCCE. As illustrated in FIG. 8, one or more ePDCCHs are allocated within in several configured PRBs or PRB pairs (e.g., three PRB pairs) in a given subframe 800. All three configured PRB pairs 805 are then aggregated for ePDCCH transmission. For localized ePDCCH transmission, one eCCE consists of several eREGs that are uniformly distributed within single PRB. For example, eCCE 810 consists of six uniformed distributed eREGs (e.g., $1^{st}$ eREG to $6^{th}$ eREG with uniform distribution), and each eREG is located in the same PRB pair. The eCCE to eREG mapping are predefined in the system and multiple eCCEs are defined. Each eCCE is associated with a logical address. The downlink control information is then transmitted on one or more eCCEs consecutively.

Figure 9:
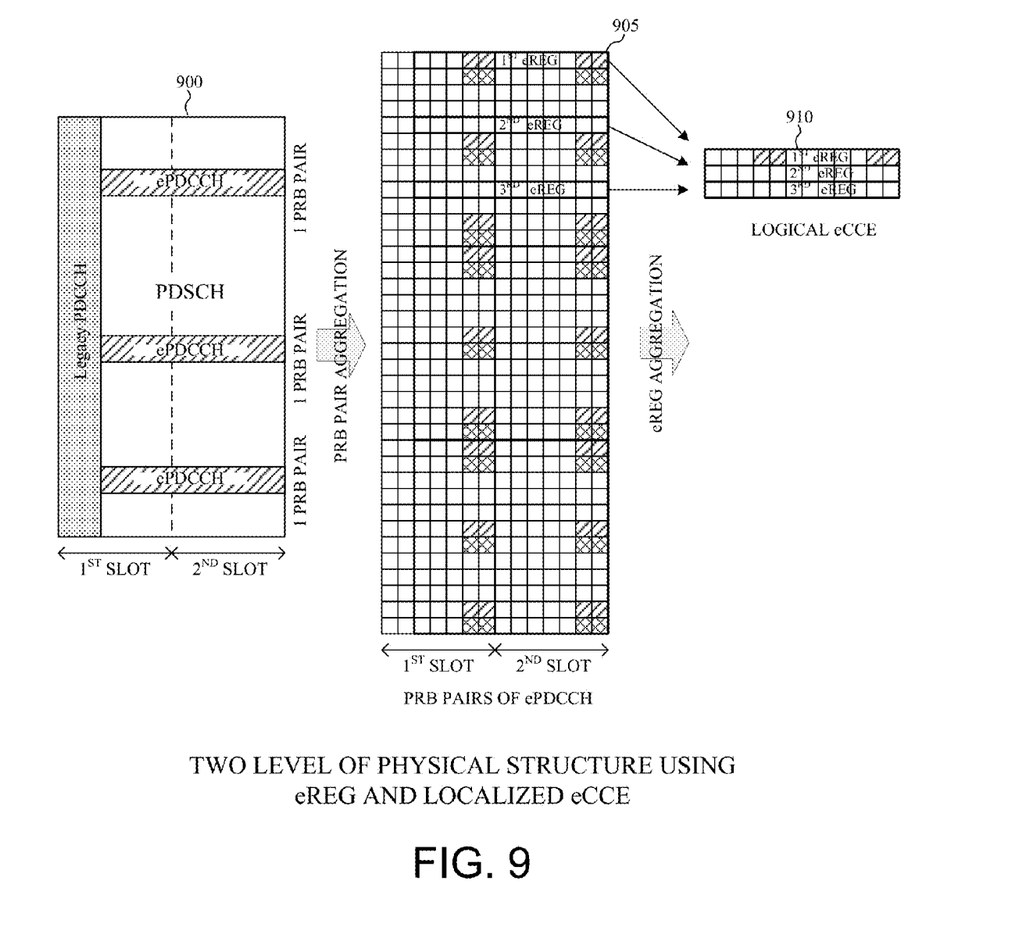
FIG. 9 illustrates a second example of two level physical structure of ePDCCH using eREG and localized eCCE.

FIG. 9 illustrates a second example of two level physical structure of ePDCCH using eREG and localized eCCE. FIG. 9 is very similar to FIG. 86, where three PRB pairs 905 are configured in a given subframe 900 and aggregated for ePDCCH transmission. In the example of FIG. 9, eCCE 910 consists of three uniformly distributed eREGs (e.g., $1^{st}$-$3^{rd}$ eREG with uniform distribution) that are located in the same PRB pair.

Figure 10:
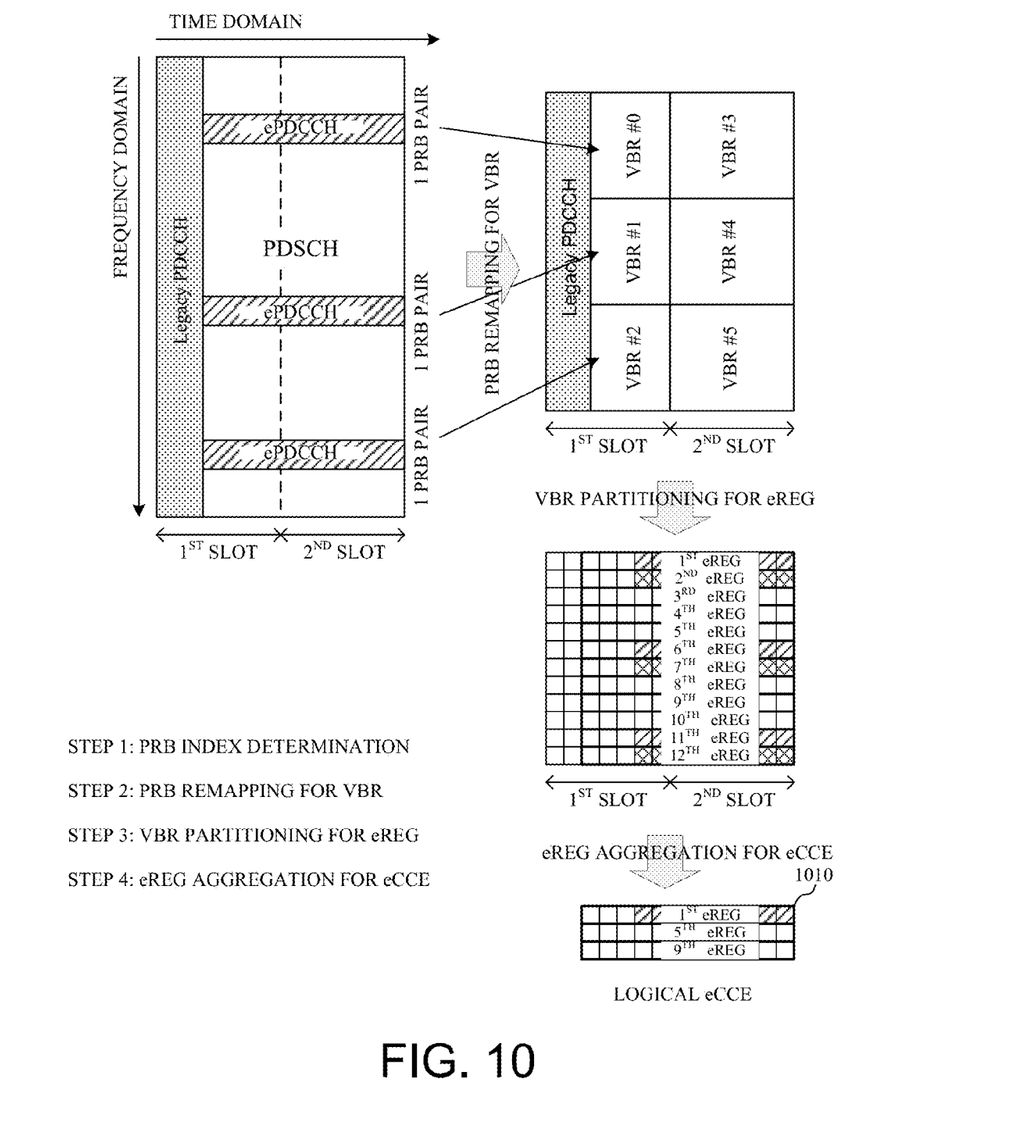
FIG. 10 illustrates a procedure for UE to determine the logical addresses of eCCEs for the transmission of downlink control information.

FIG. 10 illustrates a procedure for UE to determine the logical addresses of eCCEs for the transmission of downlink control information. In step 1, UE determines the PRBs or PRB pairs that are configured for ePDCCH transmission based on signaling from the base station. The signaling can be dynamic signaling (layer 1 signaling), semi-static signaling (RRC signaling), system information, or any combination thereof. UE decodes the signaling to determine the PRBs or PRB pairs allocated for ePDCCH transmission. For example, three PRB pairs in FIG. 10 are allocated for ePDCCH transmission. In step 2, the UE maps the PRBs to VRBs (virtual resource block), where the UE follows a predefined or configured mapping rule based in the indices of PRBs to determine the indices of the VRBs. Only the indices of each PRB are remapped to new indices of each VRB, the composing REs of each VRB remain the same as those of each corresponding PRB. In step 3, the UE follows a predefined or configured partitioning rule to partition each VRB into multiple eREGs and then determine the logical address of each eREG. In step 4, the UE follows another predefined or configured aggregation rule to aggregate multiple eREGs into single eCCE. For example, eCCE 1010 consists of three eREGs ($1^{st}$ eREG, $5^{th}$ eREG, and $9^{th}$ eREG). The multiple eREGs are distributed either in single VRB or in multiple VRBs. The UE then determines the logical address of each eCCE. Because the downlink control information is transmitted on one or more logical eCCEs by the base station, the UE can decode the downlink control information based on the logical address of the eCCEs.

Figure 11:
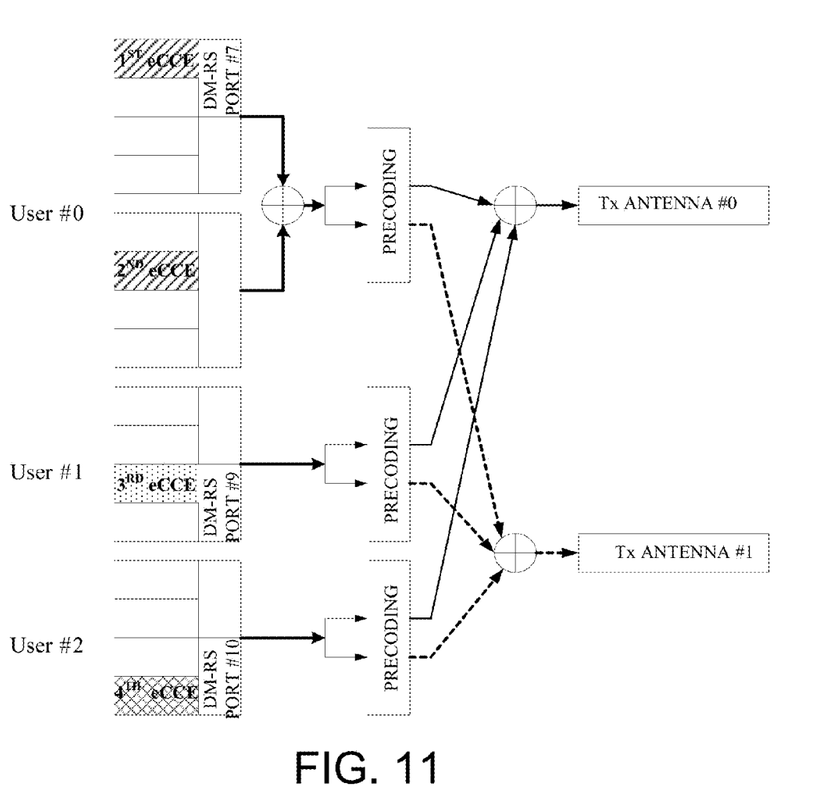
FIG. 11 illustrates one embodiment of reference signal utilization of ePDCCH.

FIG. 11 illustrates one embodiment of reference signal utilization of ePDCCH. For ePDCCH transmission, the allocated radio resources (PRB pairs) contain multiple eCCEs, which are shared among different UEs. Therefore, antenna ports used for ePDCCH demodulation need to be different for different UEs to support MIMO pre-coding. At the UE side, the utilization of antenna ports is based on the logical order of eCCEs and the aggregation level for downlink control information transmission from the base station. If the UE blindly decodes the downlink control information utilizing single eCCE, then the antenna port for ePDCCH demodulation is based on the logic address of the single eCCE. On the other hand, if the UE blindly decodes the downlink control information utilizing multiple eCCEs, then the antenna port for ePDCCH demodulation is based on the logical address of a specific eCCE among the multiple eCCEs. In other words, when the aggregation level is one, one eCCE is associated to one antenna port based on its logical order. For example, the association is based on the logic order of eCCE with modulus by four. When the aggregation level is two or more, then multiple eCCEs are associated to one antenna port based on the logical order of a specific eCCE, which can be either predefined or configured by higher layer.

In the example of FIG. 11, the base station uses two transmit antennae (Tx antenna #0 and Tx antenna #1) for ePDCCH modulation and pre-coding. For User #0, two eCCEs ($1^{st}$ eCCE and $2^{nd}$ eCCE) are aggregated for ePDCCH transmission. User #0 then decodes the downlink control information with DM-RS of antenna port #7 (based on the $1^{st}$ eCCE logical address). For User #1, single eCCE (3rd eCCE) is used for ePDCCH transmission. User #1 then decodes the downlink control information with DM-RS of antenna port #9 (based on the 3rd eCCE logical address). For User #2 single eCCE ($4^{th}$ eCCE) is used for ePDCCH transmission. For User #1, single eCCE ($4^{th}$ eCCE) is used for ePDCCH transmission. User #2 then decodes the downlink control information with DM-RS of antenna port #10 (based on the $4^{th}$ eCCE logical address).

Figure 12:
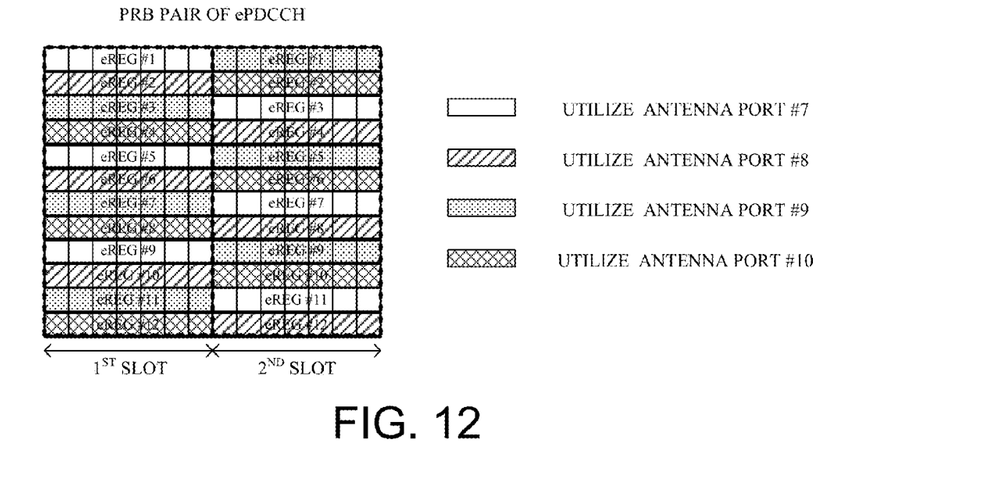
FIG. 12 illustrates another embodiment of reference signal utilization of ePDCCH.

FIG. 12 illustrates another embodiment of reference signal utilization of ePDCCH. In the example of FIG. 12, the utilization of antenna ports is based on the physical location of REs or eREGs with a specific rule. The antenna ports utilized for downlink control information (DCI) decoding are determined by the physical location of REs or eREGs where the DCI resides with a predefined rule or high-layer configuration (e.g., RRC configuration). For example, the REs of a PRB pair are divided into four partitions, each of which is either distributed or localized and associated to an antenna port of UE-specific reference signals (DM-RS).

Figure 13:
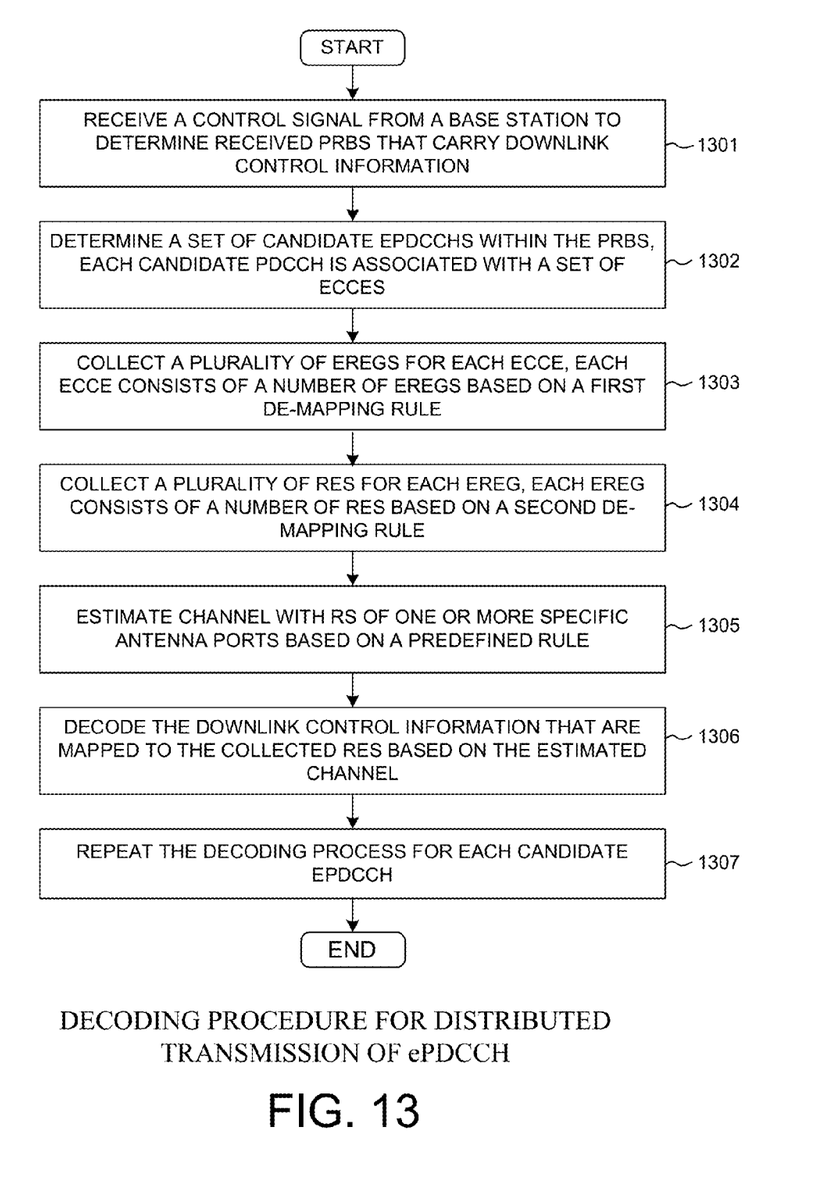
FIG. 13 is a flow chart of a method of decoding downlink control information for distributed transmission of ePDCCH.

FIG. 13 is a flow chart of a method of decoding downlink control information for distributed transmission of ePDCCH. In step 1301, a user equipment (UE) receives a control signal from a base station to determine received physical resource blocks (PRBs) or PRB pairs that carry downlink control information (DCI). For example, the control signal is from high-layer signaling (e.g., RRC layer message) that contains the PRB or PRB pair indices. In step 1302, the UE determines a set of candidate ePDCCHs within the PRB. Each candidate ePDCCH is associated with a set of enhanced control channel elements (eCCEs). The coded DCI bits, i.e., ePDCCH payload, are mapped to the set of eCCEs according to ePDCCH format by the base station. These coded bits are attached with CRC, which is masked with an RNTI according to the owner or usage of the ePDCCH. If the ePDCCH is for a specific UE, the CRC is masked with a UE unique identifier (e.g., C-RNTI). The UE monitors the set of candidate ePDCCHs using its C-RNTI to try to decode the candidates. If no CRC error is detected, then the UE determines that the specific candidate ePDCCH carries its own downlink control information.

In step 1303, the UE collects a plurality of enhanced resource element groups (eREGs) for each eCCE. Each eCCE consists of a number of eREGs based on a first de-mapping rule. For distributed transmission of ePDCCH, eCCE consists of several eREGs that are distributed in multiple non-contiguous PRBs spreading over the whole channel frequency so that frequency diversity gain can be maximally exploited using distributed eCCE structure. For localized transmission of ePDCCH, eCCE consists of several eREGs that are uniformly distributed in single PRB so that it facilitates uniform utilization of reference signals inside one PRB for better robustness in channel estimation.

In step 1304, the UE collects a plurality of resource elements (REs) for each eREG. Each eREG consists of a number of REs based on a second de-mapping rule. In a localized method of constructing eREG, eREG is a group of physically contiguous reference elements (REs), which are allocated for either data or reference signals. The group of REs span in one PRB or PRB pair. In a distributed method of constructing eREG, eREG is a group of physically distributed non-contiguous REs, which are allocated for data transmission only. The group of REs spread in one PRB or PRB pair as well.

In step 1305, the UE estimates channel coefficients for all of REs with DM-RS of one or more specific antenna ports based on a predefined rule. For example, if the UE blindly decodes the DCI utilizing single eCCE, then the antenna port for ePDCCH demodulation is based on the logic address of the single eCCE. On the other hand, if the UE blindly decodes the DCI utilizing multiple eCCEs, then the antenna port for ePDCCH demodulation is based on the logical address of a specific eCCE among the multiple eCCEs. In step 1306, the UE decodes the downlink control information that is mapped to the collected REs. The number of eCCEs used for ePDCCH transmission can be single eCCE or multiple eCCEs. Finally, in step 1307, the UE repeats the decoding process for each candidate ePDCCH.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of decoding downlink control information by a user equipment (UE) in an OFDM/OFDMA system, the method comprising:
   (a) receiving a control signal from a base station to determine received physical resource blocks (PRBs) that carry the downlink control information;
   (b) determining a set of candidate enhanced physical downlink control channels (ePDCCHs) within the PRBs, wherein each ePDCCH is associated with a set of enhanced control channel elements (eCCEs) for ePDCCH transmission;
   (c) collecting a plurality of enhanced resource element groups (eREGs) for each eCCE, wherein each eCCE consists of a number of eREGs based on an eCCE to eREG mapping rule;
   (d) collecting a plurality of resource elements (REs) for each eREG, wherein each eREG consists of a number of REs based on an eREG to RE mapping rule; and
   (e) decoding the downlink control information that are mapped to the collected REs.

2. The method of claim 1, wherein the plurality of eREGs for one eCCE are distributed in a plurality of non-contiguous PRB pairs.

3. The method of claim 1, wherein the plurality of REs for one eREG are physically contiguous REs allocated for either data or reference signal transmission within a block of physically contiguous radio resources.

4. The method of claim 1, wherein the plurality of REs for one eREG are physically distributed REs excluding REs allocated for ePDCCH demodulation reference signal transmission within a block of physically contiguous radio resources.

5. The method of claim 4, wherein the ePDCCH demodulation reference signal is UE-Specific reference signal (DM-RS).

6. The method of claim 1, wherein the UE decodes the downlink control information in either single eCCE or a plurality of eCCEs.

7. The method of claim 1, wherein the control signal is from higher layer signaling.

8. A method comprising:
   receiving downlink control information via an enhanced physical downlink control channel (ePDCCH) by a user equipment (UE) in an OFDM/OFDMA system, wherein the ePDCCH is associated with a set of enhanced control channel elements (eCCEs);
   decoding the downlink control information with reference signals of a first specific antenna port based on a logical address of a single eCCE if the UE decodes the downlink control information utilizing the single eCCE for ePDCCH transmission; and
   decoding the downlink control information with reference signals of a second specific antenna port based on a logical address of a specific eCCE among a plurality of eCCEs if the UE decodes the downlink control information utilizing the plurality of eCCEs for ePDCCH transmission.

9. The method of claim 8, wherein each eCCE consists of a plurality of enhanced resource element groups (eREGs) based on an eCCE to eREG mapping rule.

10. The method of claim 9, wherein the plurality of eREGs for one eCCE are distributed in a plurality of non-contiguous PRBs.

11. The method of claim 9, wherein each eREG consists of a plurality of resource elements (REs) based on an eREG to RE mapping rule.

12. A user equipment (UE) in an OFDM/OFDMA system, the UE comprises:
   a receiver that receives a control signal from a base station to determine received physical resource blocks (PRBs) that carry the downlink control information;
   a controller that determines a set of candidate enhanced physical downlink control channels (ePDCCHs) within the PRBs, wherein each ePDCCH is associated with a set of enhanced control channel elements (eCCEs) for ePDCCH transmission;
   a collector that collects a plurality of enhanced resource element groups (eREGs) for each eCCE, wherein each eCCE consists of a plurality of eREGs based on an eCCE to eREG mapping rule, wherein the collector module also collects a plurality of resource elements (REs) for each eREG, wherein each eREG consists of a plurality of REs based on an eREG to RE mapping; and
   a decoder that decodes the downlink control information that are mapped to the collected REs.

13. The UE of claim 12, wherein the plurality of eREGs for one eCCE are distributed in a plurality of non-contiguous PRB pairs.

14. The UE of claim 12, wherein the plurality of REs for one eREG are physically contiguous REs allocated for either data or reference signal transmission within a block of physically contiguous radio resources.

15. The UE of claim 12, wherein the plurality of REs for one eREG are physically distributed REs excluding REs allocated for ePDCCH demodulation reference signal transmission within a block of physically contiguous radio resources.

16. The UE of claim 15, wherein the ePDCCH demodulation reference signal is UE-Specific reference signal (DM-RS).

17. The UE of claim 12, wherein the UE decodes the downlink control information in either single eCCE or a plurality of eCCEs.

18. The UE of claim 12, wherein the control signal is from higher layer signaling.

19. The UE of claim 12, wherein the UE decodes the downlink control information with reference signals of a specific antenna port based on a logical address of a single eCCE if the UE decodes the downlink control information utilizing the single eCCE for ePDCCH transmission.

20. The UE of claim 12, wherein the UE decodes the downlink control information with reference signals of a specific antenna port based on a logical address of a specific eCCE among a plurality of eCCEs if the UE decodes the downlink control information utilizing the plurality of eCCEs for ePDCCH transmission.

* * * * *